Figure 1:
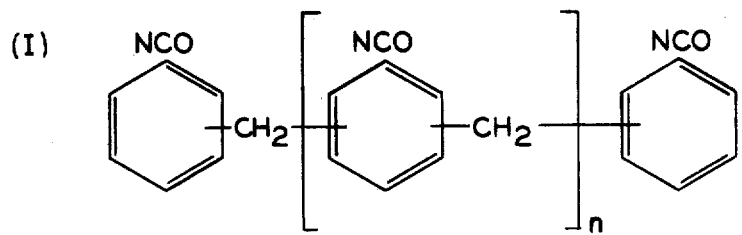

United States Patent [19]

Skowronski et al.

[11] 4,362,678

[45] Dec. 7, 1982

[54] METHOD OF MAKING POLYISOCYANURATE FOAM LAMINATE

[75] Inventors: Michael J. Skowronski, Clearwater; Alberto DeLeon, St. Petersburg, both of Fla.

[73] Assignee: The Celotex Corporation, Tampa, Fla.

[21] Appl. No.: 312,584

[22] Filed: Oct. 19, 1981

Related U.S. Application Data

[62] Division of Ser. No. 113,436, Jan. 18, 1980, Pat. No. 4,311,801, which is a division of Ser. No. 911,502, Jun. 1, 1978, Pat. No. 4,212,917.

[51] Int. Cl.³ .................. B32B 3/26; B32B 5/20; B32B 31/14; B29D 7/14
[52] U.S. Cl. .................. 264/46.3; 156/79; 428/425.5; 428/425.8; 428/319.1; 428/319.3; 428/304.4; 521/125; 521/902; 521/128; 521/129; 521/131; 521/160; 521/174
[58] Field of Search ............... 156/79; 428/313, 310, 428/315, 425.5, 425.8; 521/902, 125, 128, 129, 131, 160, 174; 264/46.3

[56] References Cited

U.S. PATENT DOCUMENTS

| | | | |
|---|---|---|---|
| 2,683,730 | 7/1954 | Seeger et al. | 260/578 |
| 3,526,652 | 9/1970 | Powers | 521/162 |
| 3,799,896 | 3/1974 | Moss | 521/114 |
| 3,867,494 | 2/1975 | Rood et al. | 264/46.3 |
| 3,885,009 | 5/1975 | Rivat-Lahousse | 264/46.3 |
| 3,903,346 | 9/1975 | DeLeon et al. | 428/322 |
| 3,940,517 | 2/1976 | DeLeon | 156/78 |
| 3,959,049 | 5/1976 | Tanaka et al. | 264/46.3 |
| 4,025,687 | 5/1977 | Wooler et al. | 428/310 |
| 4,110,270 | 8/1978 | Narayan | 521/902 |
| 4,118,533 | 10/1978 | Hipchen et al. | 428/313 |
| 4,121,958 | 10/1978 | Koontz | 156/79 |
| 4,129,697 | 12/1978 | Schaepel et al. | 521/902 |
| 4,212,917 | 7/1980 | Skowronski et al. | 428/310 |
| 4,311,801 | 1/1982 | Skowronski et al. | 521/110 |

FOREIGN PATENT DOCUMENTS

| | | |
|---|---|---|
| 2289342 | 5/1976 | France . |
| 2348203 | 11/1977 | France . |
| 1155768 | 6/1969 | United Kingdom . |
| 1433643 | 4/1976 | United Kingdom . |
| 1472245 | 5/1977 | United Kingdom . |

*Primary Examiner*—H. S. Cockeram
*Attorney, Agent, or Firm*—James W. Grace; Charles W. Vanecek

[57] ABSTRACT

A process for producing a laminate of polyisocyanurate foam which is the reaction product of a polymethylene polyphenylisocyanate and a polyol which is ethoxylated trimethylol propane, ethoxylated trimethylol ethane, ethoxylated pentaerythritol or ethoxylated glycerin. Laminates of such foams exhibit improved adhesion of the facing sheet.

13 Claims, 7 Drawing Figures

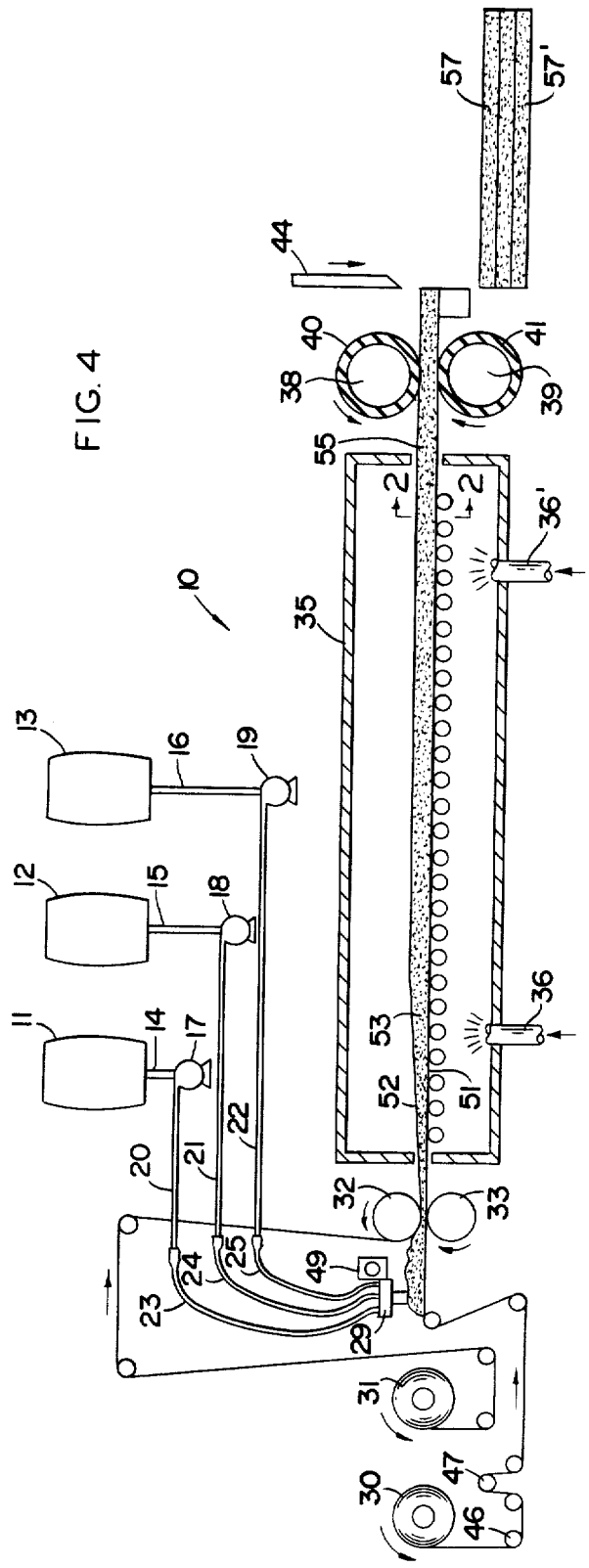

METHOD OF MAKING POLYISOCYANURATE FOAM LAMINATE

This is a division application of Ser. No. 113,436, filed Jan. 18, 1980, now U.S. Pat. No. 4,311,801, which is a division of Ser. No. 911,502, filed June 1, 1978, now U.S. Pat. No. 4,212,917.

DISCLOSURE

Polyisocyanurate foams are well known and are described, for example, in Moss, U.S. Pat. No. 3,799,896, DeLeon, U.S. Pat. No. 3,940,517 and in U.K. Pat. No. 1,155,768. It is also known to employ polyisocyanurate foams as the core of a laminate having one or two facing sheets as described, for example, in DeLeon, supra. Unfortunately, the adhesion of the facing sheet to the laminate has not been as great as desired. Poor facing sheet adhesion can result in delamination.

Accordingly, it is an object of the present invention to provide an improved polyisocyanurate foam which is substantially free of the disadvantages of prior foams.

Another object is to provide an improved polyisocyanurate foam which has improved facing sheet adhesion without adversely affecting the other physical and chemical properties of the foam.

A further object is to provide a process for making an improved polyisocyanurate foam which has improved facing sheet adhesion without adversely affecting the other physical and chemical properties of the foam.

Yet another object is to provide an improved laminate wherein the facing sheet adheres tenaciously to the polyisocyanurate foam core without altering other advantageous properties of the foam such as friability.

Figure 2:
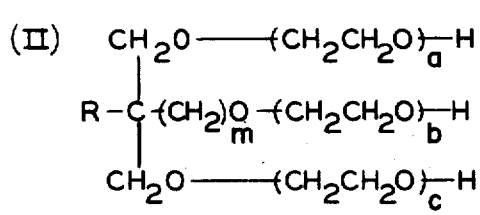
Figure 3:
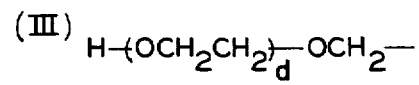
Figure 5:
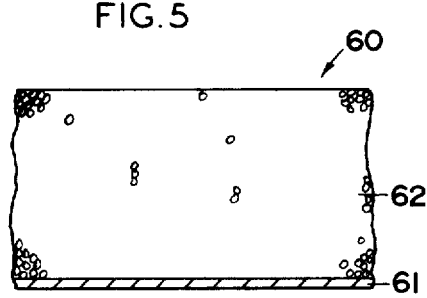
Figure 6:
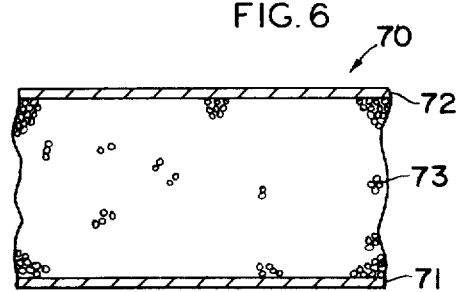
Figure 7:
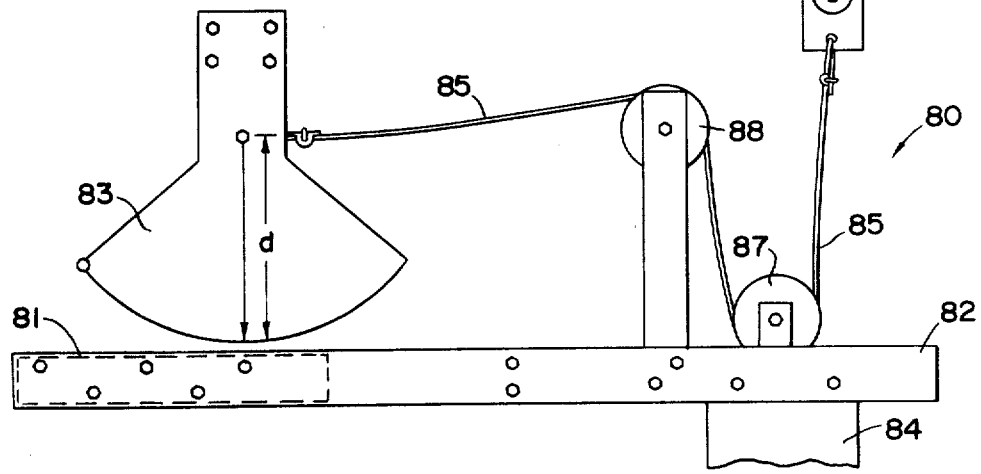

The isnvention may be better understood by reference to the drawings wherein:

FIG. 1 is Formula I;
FIG. 2 is Formula II;
FIG. 3 is Formula III;
FIG. 4 shows an apparatus suitable for practicing the process of the present invention;
FIG. 5 shows a cross-sectional view of a laminate of the present invention;
FIG. 6 shows a cross-sectional view of another laminate of the present invention;
FIG.7 shows an apparatus used to measure the peel strength of the laminate.

According to the present invention, there is provided a polyisocyanurate foam which is the reaction product of a polymethylene polyphenylisocyanate and a polyol selected from the group consisting of ethoxylated trimethylol propane, ethoxylated trimethylol ethane, ethoxylated pentaerythritol and ethoxylated glycerin wherein the equivalent ration of polymethylene polyphenylisocyanate to polyol is 2:1 to 6:1. Such a polyisocyanurate foam exhibits improved facer adhesion.

In the broadest aspects of the present invention, any polymethylene polyphenylisocyanate can be employed. The preferred polymethylene polyphenylisocyanates have a functionality of 2.1 to 3.2; an equivalent weight between 120 and 180; and a viscosity between 150 and 2500 centipoises measured at 25° C. A preferred subclass of polymethylene polyphenylisocyanates are those of Formula I, shown in FIG. 1 of the drawings, wherein n is an integer from 0 to 8 inclusive. The synthesis of polymethylene polyphenylisocyanates is described in Seeger et al., U.S. Pat. No. 2,683,730 and in Powers, U.S. Pat. No. 3,526,652 at Column 3, Lines 6-21. Examples of suitable, commercially available polymethylene polyphenylisocyanates include, among others, those sold under the trade names PAPI-20, MONDUR MRS, MONDUR MR-200, MONDUR MR and MONDUR E-468.

The ethoxylated polyols useful in the present invention are of Formula II, shown in FIG. 2 of the drawings, wherein m is 0 or 1 and R is hydrogen, lower alkyl or a radical of Formula III, shown in FIG. 3 of the drawings and wherein the sum of $a+b+c+d$ is between 2.0 and 8.0 and preferably between 2.5 and 4.0. If the sum of $a+b+c+d$ is less than 2.0 there is poor facing sheet adhesion and if it is greater than 8.0 the resultant polyisocyanurate foam is too flammable.

The preferred ethoxylated polyols useful in the present invention are ethoxylated trimethylol propane, ethoxylated trimethylol ethane, ethoxylated pentaerythritol and ethoxylated glycerin. Ethoxylated trimethylol propane is most preferred because of cost, availability and reactivity. The ethoxylation is conducted by contacting the trimethylol propane, the trimethylol ethane, the pentaerythritol or the glycerin with ethylene oxide in a molar ratio of 1:2 to 1:8 and preferably 1:2.5 to 1:4 to produce the ethoxylated polyol. The ethoxylated polyols useful in the present invention generally have a hydroxyl number of 330 to 1600 and preferably 450 to 750 and an equivalent weight of 35 to 170 and preferably 75 to 125. Equivalent weight refers to grams of polyol per mole of hydroxyl group. Examples of suitable ethoxylated polyols useful in the present invention are given in Table I.

TABLE I

| Name | Supplier | Hydroxyl Number | Equivalent Weight | Mole of EO per mole of polyol |
|---|---|---|---|---|
| Isonol-93 (TMP-EO) | Upjohn | 620 | 88 | 3.0 |
| 4969-41 (TMP-EO) | Jefferson Chemicals | 623 | 90 | 3.1 |
| 4969-46 (PEP-EO) | Jefferson Chemicals | 487 | 115 | 7.5 |
| TMP-EO | Wyandotte | 560 | 100 | 3.8 |
| Ethoxylated Glycerine | Union Carbide | 625 | 90 | 3.1 |

EO is ethylene oxide
TMP is trimethylol propane
PEP is pentaerythritol

The polyisocyanate can be reacted with the ethoxylated polyol in widely varying molar ratios but is generally reacted at equivalent ratios of 2:1 to 6:1.

Any catalyst that will induce reaction of the isocyanate with the polyol and will induce isocyanurate ring formation can be employed. The preferred catalyst is a mixture of equimolar amounts of 2,4,6-tris-(dimethyl amino methyl) phenol and potassium octoate. The catalyst is employed in an amount that will give the desired reactivity profile. By reactivity profile is meant cream time, firm time, and tack-free time. The catalyst generally comprises from 0.1 to 10 and preferably from 1 to 5 weight percent of the reaction mixture.

Any blowing agent can be employed that will give the polyisocyanurate foam the desired bulk density. The desired bulk density is generally between 0.5 and 10 and preferably between 1 and 5 pounds per cubic foot. Examples of suitable blowing agents include, among others, dichlorofluoro-difluorochloroethane and trichlorofluoro-methane or a mixture of the two. The blowing agent generally comprises from 1 to 30 and preferably comprises from 5 to 20 weight percent of the reaction mixture.

Successful results have been obtained with silicone-/ethylene-oxide/propylene-oxide copolymers as surfactants. Examples of surfactants useful in the present invention include, among others, polydimethylsiloxane-polyoxyalkylene block copolymers available from the Union Carbide Corporation under the trade names "L-5420" and "L-5340" and from the Dow Corning Corporation under the trade names "DC-193" and "Q2-5098".

The surfactant generally comprises from 0.05 to 4, and preferably comprises from 0.1 to 2 weight percent of the composition.

Other catalysts, blowing agents and surfactants useful in the present invention are described in DeLeon, supra.

The polyisocyanurate foams in the present invention are simply produced by mixing the components with the result that foaming and curing take place. The mixing can be accomplished at 0° to 50° C., and preferably at 10° to 30° C. The process can be practiced as a batch or continuously. It has been found that the foam of the present invention improves the adhesion of a wide variety of facing sheets, such as those of steel, aluminum, plastic, asbestos, and felt. Adhesion is improved whether the facing sheets are employed as such or whether coated with conventional coating compositions such as vinyl or epoxy compounds.

Referring now to FIG. 4 of the drawings, there is shown schematically an apparatus 10 suitable for use in connection with the present invention. The apparatus 10 comprises an isocyanate tank 11, a polyol tank 12, and a catalyst tank 13, each respectively connected to outlet lines 14, 15, and 16. The lines 14, 15, and 16 form the inlet to metering pumps 17, 18, and 19. The pumps 17, 18, and 19 discharge respectively through lines 20, 21, and 22 which are in turn respectively connected to flexible lines 23, 24, and 25. The flexible lines 23, 24, and 25 discharge to mixing head 29. The apparatus 10 is also provided with a roll 30 of lower substrate material and a roll 31 of upper substrate material. The apparatus 10 is also provided with metering rolls 32 and 33, and an oven 35 provided with vents 36, 36' for blowing hot air. The apparatus 10 is also provided with pull rolls 38, 39 and cutting knife 44.

In operation, the isocyanate tank 11 is charged with the organic polyisocyanate admixed with the blowing agent and the surfactant, the polyol tank 12 is charged with the polyol, and the catalyst tank 13 is charged with the catalyst composition. The speeds of the pumps 17, 18, and 19 are adjusted to give the desired ratios of the ingredients in the tanks 11, 12, and 13. These ingredients pass respectively through lines 20, 21, and 22 as well as lines 23, 24, and 25, whereupon they are mixed in the mixing head 29 and discharged therefrom. The pull rolls 38, 39 each of which has a flexible outer sheath 40, 41 are caused to rotate in the direction of the arrows by a power source (not shown). By virtue of rotation of the pull rolls 38, 39 lower substrate material is pulled from the roll 30, whereas upper substrate material is pulled from the roll 31. The substrate material passes over idler rollers such as idler rollers 46 and 47 and is directed to the nip between metering rolls 32, 33. The mixing head 29 is caused to move back and forth, i.e., out of the plane of the paper by virtue of its mounting on reversible mechanism 49. In this manner, an even amount of material can be maintained upstream of the nip between the metering rolls 32, 33. The composite structure at this point now comprising a lower substrate 51, an upper substrate 52 on either side of a core 53, now passes into the oven 35. While in the oven 35 the core expands under the influence of heat added by the hot air from vents 36, 36' and due to the heat generated in the exothermic reaction in the presence of the catalyst. The temperature within oven 35 is controlled by varying the temperature of the hot air from vents 36, 36', in order to insure that the temperature within the oven 35 is maintained between 150° and 350° F. and preferably between 200° and 280° F. The composite structure 55 then leaves the oven 35, passes between the nip of the pull rolls 38, 39 and is cut by a knife 44 into individual panels 57, 57'.

Numerous modifications to the apparatus 10 will be immediately apparent to those skilled in the art. For example, the tanks 11, 12, and 13 can be provided with refrigeration means in order to maintain the reactants at subambient temperatures.

In FIG. 5 there is shown a laminated building panel 60 of the present invention. The building panel 60 comprises a single facing sheet 61 having thereon cellular material 62 of the present invention.

FIG. 6 shows a building panel 70 of the present invention having two facing sheets 71 and 72 on either side of a cellular material 73.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

This example illustrates the synthesis of a novel resin of the present invention, and a novel laminate of the present invention.

The following quantities of the following ingredients are combined as indicated.

| Item | Ingredient | Quantity Grams | Equivalents |
|---|---|---|---|
| A | polymethylene polyphenyl isocyanate | 277 | 2.00 |
| B | CFCl₃ | 57.0 | — |
| C | silicone surfactant | 6.0 | — |
| D | ethoxylated trimethylol propane | 33.5 | 0.38 |
| E | 2,4,6-tris (dimethylamino methyl) phenol | 0.84 | — |
| F | potassium octoate (70% solution in G) | 2.50 | — |
| G | polyoxyethylene glycol | 6.66 | — |

Items A, B, and C are mixed together in a first vessel and cooled to 60° F. Item D is then mixed into the contents of the first vessel. Items E, F and G are mixed in a second vessel and the contents of the second vessel then mixed into the contents of the first vessel. Immediately thereafter, the contents of the first vessel are poured onto a first steel facing sheet 8" × 18" × 0.0285" (22 gauge). A second identical plate is suspended two inches above the upper surface of the first plate. The two facing sheets with the reacting mixture therebetween are maintained at 150° F. for 20 minutes to produce a laminate of the two steel facing sheets with the resultant from core therebetween. This laminate is tested for peel strength and the results recorded in Columns 10 through 13 of Table II.

The polymethylene polyphenyl isocyanate employed in this Example has an equivalent weight of 138, an acidity of 0.03% HCl, a viscosity of 2000 centipoises at 25° C. and is available from the Mobay Chemical Company, Pittsburgh, Pennsylvania under the trade name "MONDUR MR-200."

The silicone surfactant is that available from the Union Carbide Corporation under the designation "L-5340."

The ethoxylated trimethylol propane employed in the present example is Isonol-93, whose characteristics are given in Table I.

The polyoxyethylene glycol has a molecular weight of 200 and is used as solvent for the potassium octoate.

The properties of the foam and of the laminate are measured and are recorded in Columns 4 through 13 of Table II.

The thermal conductivity is measured directly on an Anacon Model 88 Tester available from the Anacon Company, Ashland, Massachusetts. The data recorded in Column 5 of Table II is measured 18 days after foam formation.

Oxygen index is measured according to ASTM D-2863-70 except that a sample measuring 0.5"×0.5"×6" is used.

Friability is measured according to ASTM C-421 wherein the test is conducted for 10 minutes.

Compressive strength is measured according to ASTM D-1621-73, Procedure A.

Tensile Strength is measured according to ASTM D-1623-72.

Peel strength is measured on the apparatus 80 shown in FIG. 7 according to the following procedure. An 8" wide by 18" long specimen 81 is used to test for peel strength values. This specimen 81 is rigidly mounted in a base frame 82. An aluminum quadrant 83 with a radius d of 10 inches is fixed to the leading edge on the crosshead of a floor model TT-D Instron 84. A constant test rate of 20 inches per minute is applied by a wire cable 85 attached to the aluminum quadrant 83, then to a cell 86 via two pulleys 87 and 88 with the cable 85 looped around them. One specimen 81 has both sides tested, top and bottom, recording both maximum and minimum loads in pounds in each case.

EXAMPLES 2-9

The procedure of Example 1 is repeated except that Item D is replaced with the polyol noted in Column 3 of Table II. The amount of the polyol is adjusted such that the percent isocyanurate is maintained constant at 22%. The weight of polyol is calculated by using the following formula:

$$\text{wt. of polyol} = \frac{277}{\left[\frac{4200(\text{polyol equiv. wt.} + \text{isocyanate equiv. wt.})}{[4200 - (\text{isocyanate equiv. wt.})(\% \text{ isocyanurate})](\text{polyol equiv. wt.})}\right]}$$

where $$\% \text{ Isocyanurate} = \frac{4200(\text{equivalents NCO} - \text{equivalents OH})}{\text{weight of isocyanate} + \text{weight of polyol}}$$

wherein the weight is in grams.

The amount of Item A was held constant at 277 grams.

The amount of Item B was held constant at 14.5 ±0.5 weight percent based upon the weight of all ingredients.

The amounts of Items D and E were adjusted to give an equivalent reactivity profile.

It can clearly be seen by reference to Table II that of the comparative examples, only Example 6 has an acceptable facing sheet adhesion as indicated by the peel strength. However, the friability is undesirably high, making the foam unacceptable. All the inventive examples have an initial strength of at least 7.9 pounds for the top facing sheet.

EXAMPLE 10

The reactants in equivalent quantities described in Example 1 are used with the apparatus shown in FIG. 4. Items A and B are mixed with each other and placed in tank 11. Items C and D are mixed with each other and placed in tank 12. Items E, F and G are mixed together and placed in tank 13. The apparatus 10 is provided with aluminum foil on rolls 30, 31. The laminate produced is cut into building panels 57, 57", which have similar properties to those described in the inventive examples shown in Table II.

TABLE II

| 1. Example Number | 2. Inventive or Comparative | 3. Polyol | 4. Density lbs/ft³ | 5. Thermal Conductivity BTU/hr °F. ft²/in. | 6. Oxygen Index (unitless) | 7. Friability (psi) | 8. Compressive Strength (psi) ASTM-D-1621-73 | 9. Tensile Strength ASTM-1623-72 (psi) | PEEL STRENGTH TOP FACER | | PEEL STRENGTH BOTTOM FACER | |
|---|---|---|---|---|---|---|---|---|---|---|---|---|
| | | | | | | | | | 10. Initial Pounds | 11. Continuous Pounds | 12. Initial Pounds | 13. Continuous Pounds |
| 1 | I | Isonol 93 | 2.05 | 0.148 | 27.3 | 26.3 | 39.7 | 31.3 | 11.2 | 6.5 | 11.3 | 5.2 |
| 2 | I | 4969-41 | 1.92 | 0.149 | 27.3 | 25.0 | 33.0 | 26.0 | 11.8 | 5.7 | 10.9 | 5.6 |
| 3 | I | TMP-EO | 1.97 | 0.150 | 27.6 | 25.0 | 35.0 | 33.6 | 14.0 | 6.0 | 12.5 | 5.8 |
| 4 | I | 4969-46 | 1.86 | 0.157 | 27.2 | 36.2 | 29.6 | 26.8 | 7.9 | 5.0 | 6.0 | 4.0 |
| 5 | I | Ethoxylated Glycerin | 1.85 | 0.128 | 27.0 | 24.3 | 34.5 | ND* | 10.1 | 6.6 | 7.5 | 5.4 |
| 6 | C | Ethylene Glycol | 1.47 | 0.178 | 28.9 | 69.4 | 20.6 | 21.4 | 12.8 | 7.1 | 11.3 | 7.1 |
| 7 | C | Diethylene Glycol | 1.90 | 0.146 | 28.1 | 20.6 | 34.0 | 37.2 | 0 | 0 | 0 | 0 |
| 8 | C | Triethylene Glycol | 1.94 | 0.144 | 27.8 | 20.5 | 32.0 | 36.3 | 0 | 0 | 0 | 0 |
| 9 | C | Methyl | 1.94 | 0.169 | 26.3 | 37.4 | 26.0 | 25.4 | 0 | 0 | 0 | 0 |

TABLE II-continued

| 1. Example Number | 2. Inventive or Comparative | 3. Polyol | 4. Density lbs/ft³ | 5. Thermal Conductivity BTU/hr °F. ft²/in. | 6. Oxygen Index (unit less) | 7. Friability (psi) | 8. Compressive Strength (psi) ASTM-D-1621-73 | 9. Tensile Strength ASTM-1623-72 (psi) | PEEL STRENGTH | | | |
|---|---|---|---|---|---|---|---|---|---|---|---|---|
| | | | | | | | | | TOP FACER | | BOTTOM FACER | |
| | | | | | | | | | 10. Initial Pounds | 11. Continuous Pounds | 12. Initial Pounds | 13. Continuous Pounds |
| | | Glucoside | | | | | | | | | | |

*ND = NOT DETERMINED

Although the invention has been described in considerable detail with reference to certain preferred embodiments thereof, it will be understood that variations and modifications can be effected within the spirit and scope of the invention as described above and as defined in the appended claims.

What is claimed is:

1. A process for producing a laminate comprising:
   (I) contacting at least one facing sheet with a polyisocyanurate foam-forming mixture comprising:
   (A) a polymethylene polyphenylisocyanate;
   (B) a polyol having the formula:

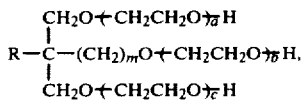

wherein m is 0 or 1, R is hydrogen, hydroxyl, lower alkyl or a radical having the formula:

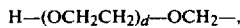

the sum of a+b+c+d is between 2.0 and 8.0, and the equivalent ratio of A:B is 2:1 to 6:1;
   (C) a catalyst;
   (D) a blowing agent; and
   (E) a surfactant; and
   (II) foaming said foam-forming mixture.

2. The process of claim 1 wherein the polyol has the formula:

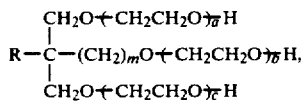

wherein m is 0 or 1, R is hydrogen, lower alkyl, or a radical having the formula:

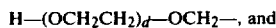

the sum of a+b+c+d is between 2.0 and 8.0.

3. The process of claim 2 wherein the polyol is a member selected from the group consisting of ethoxylated trimethylol propane, ethoxylated trimethylol ethane, ethoxylated pentaerythritol and ethoxylated glycerin.

4. The process of claim 2 wherein the polymethylene polyphenylisocyanate is a mixture of polyisocyanates having the formula:

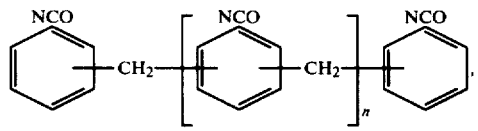

wherein the mixture has:
(a) a functionality of 2.1 to 3.2,
(b) an equivalent weight between 120 and 180,
(c) a viscosity at 25° C. between 150 and 2500 centipoises, and
(d) n is an integer from 0 to 8 inclusive.

5. The process of claim 4 wherein the polyol is a member selected from the group consisting of ethoxylated trimethylol propane, ethoxylated trimethylol ethane, ethoxylated pentaerythritol and ethoxylated glycerin.

6. The process of claim 4 wherein the polyol is ethoxylated trimethylol propane.

7. The process of claim 2 or 5 wherein the polyol has an equivalent weight of 60 to 170.

8. The process of claim 7 wherein the polyol has an equivalent weight of 75 to 125.

9. The process of claim 8 wherein the polyol is a member selected from the group consisting of ethoxylated trimethylol propane, ethoxylated pentaerythritol and ethoxylated glycerin.

10. The process of claim 8 wherein the polyol is ethoxylated trimethylol propane.

11. The process of claim 1 for producing a laminate comprising:
   (I) contacting at least one facing sheet with a polyisocyanurate foam-forming mixture comprising:
   (A) a polymethylene polyphenylisocyanate which is a mixture of polyisocyanates having the formula:

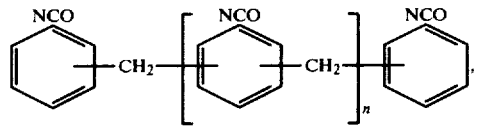

wherein the mixture has:
(a) a functionality of 2.1 to 3.2,
(b) an equivalent weight between 120 and 180,
(c) a viscosity at 25° between 150 and 2500 centipoises, and
(d) n is an integer from 0 to 8 inclusive;
   (B) a polyol which is a member selected from the group consisting of ethoxylated trimethylol propane, ethoxylated trimethylol ethane, ethoxylated pentaerythritol and ethoxylated glycerin and has an equivalent weight of 75 to 125;
(C) a catalyst;
(D) a blowing agent; and
(E) a surfactant;
wherein the equivalent ratio of A:B is 2:1 to 6:1,
C comprises from 1 to 5 weight percent of the reaction mixture,
D comprises 5 to 20 weight percent of the reaction mixture, and
E comprises 0.1 to 2 weight percent of the reaction mixture; and (II) foaming said foam-forming mixture.

12. The process of claim 4 or 11 wherein:
(A) the polyol is a member selected from the group consisting of ethoxylated trimethylol propane, ethoxylated pentaerythritol and ethoxylated glycerin and has an equivalent weight of 75 to 125;
(B) the catalyst is a mixture of 2,4,6-tris(dimethylaminomethyl) phenol and potassium octoate;
(C) the blowing agent is trichlorofluoromethane; and
(D) the surfactant is a silicone surfactant.

13. The process of claim 12 wherein the polyol is ethoxylated trimethylol propane.

* * * * *